United States Patent
Hu et al.

(10) Patent No.: US 9,258,486 B2
(45) Date of Patent: Feb. 9, 2016

(54) OPTICAL ANTI-SHAKE APPARATUS WITH SWITCHABLE LIGHT PATH

(71) Applicant: TDK Taiwan Corp., Taipei (TW)

(72) Inventors: Chao Chang Hu, Taoyuan County (TW); Chih Wei Weng, Taoyuan County (TW)

(73) Assignee: TDK Taiwan Corp., Taiwan (TW)

( * ) Notice: Subject to any disclaimer, the term of this patent is extended or adjusted under 35 U.S.C. 154(b) by 0 days.

(21) Appl. No.: 14/317,220

(22) Filed: Jun. 27, 2014

(65) Prior Publication Data

US 2015/0002683 A1    Jan. 1, 2015

(30) Foreign Application Priority Data

Jul. 1, 2013 (TW) .............................. 102123439 A (51) Int. Cl.
| | |
|---|---|
| H04N 5/228 | (2006.01) |
| H04N 5/232 | (2006.01) |
| G02B 26/08 | (2006.01) |
| H04N 5/225 | (2006.01) |

(52) U.S. Cl.
CPC ............ *H04N 5/2328* (2013.01); *G02B 26/085* (2013.01); *H04N 5/2259* (2013.01); *H04N 5/23258* (2013.01)

(58) Field of Classification Search
CPC .............. H04N 5/2328; H04N 5/2259; H04N 5/23258; G02B 26/085
USPC .................... 348/208.11, 208.8, 208.7, 208.4, 348/208.99
See application file for complete search history.

(56) References Cited

U.S. PATENT DOCUMENTS

| | | | | |
|---|---|---|---|---|
| 5,822,122 | A * | 10/1998 | Kuno et al. .................... | 359/557 |
| 7,375,905 | B2 * | 5/2008 | Jin ................................ | 359/726 |
| 2007/0035631 | A1* | 2/2007 | Ueda ........................ | G03B 5/00 |
| | | | | 348/208.99 |
| 2009/0111512 | A1* | 4/2009 | Demuynck .............. | G02B 7/08 |
| | | | | 455/556.1 |
| 2011/0150442 | A1* | 6/2011 | Ollila et al. ..................... | 396/55 |

(Continued)

FOREIGN PATENT DOCUMENTS

| | | |
|---|---|---|
| CN | 20061016481.7 | 12/2006 |
| JP | 2-183216 | 7/1990 |

(Continued)

OTHER PUBLICATIONS

Office action re Japanese application 2014-131271, Jun. 9, 2015.

(Continued)

*Primary Examiner* — Sinh Tran
*Assistant Examiner* — Zhenzhen Wu (57) ABSTRACT

An optical anti-shake apparatus with a switchable light path is furnished in an optical system having two light paths of different directions. The optical system also comprises a lens module, an image capturing module, an anti-shake device and a switching device. The lens module corresponds to the image capturing module in position. The switching device comprises a fixing member, a rotary member and a driving module. The rotary member is pivotal about the fixing member. The driving module is located between the rotary member and the fixing member. The anti-shake device is located on the rotary member such that the driving module can drive and rotate the rotary member together with the anti-shake device in order to perform switching operations, and thereby the light of either of the two light paths can be directed toward the lens module so as to focus at the image capturing module.

9 Claims, 10 Drawing Sheets

(56) References Cited

U.S. PATENT DOCUMENTS

| | | | |
|---|---|---|---|
| 2012/0128339 A1* | 5/2012 | Hu | 396/55 |
| 2014/0063322 A1* | 3/2014 | Chan et al. | 348/335 |
| 2014/0340536 A1* | 11/2014 | Scherling | G03B 5/00 348/208.8 |

FOREIGN PATENT DOCUMENTS

| | | |
|---|---|---|
| JP | 7-234191 | 9/1995 |
| JP | 2000-10139 | 1/2000 |
| JP | 7-104335 | 4/2005 |
| JP | 2007-206660 | 8/2007 |
| JP | 2008-124763 | 5/2008 |
| JP | 2008-242207 | 10/2008 |
| JP | 2009-526257 | 7/2009 |
| JP | 2009-265415 | 11/2009 |
| JP | 2010-145575 | 7/2010 |
| JP | 2010-176073 | 8/2010 |
| TW | 1321946 | 12/1998 |
| TW | 201217899 | 5/2012 |
| WO | WO2012/077772 | 6/2012 |

OTHER PUBLICATIONS

Office action re Taiwanese application 102123439, Sep. 3, 2015.

* cited by examiner

OPTICAL ANTI-SHAKE APPARATUS WITH SWITCHABLE LIGHT PATH

This application claims the benefit of Taiwan Patent Application Serial No. 102123439, filed Jul. 1, 2013, the subject matter of which is incorporated herein by reference.

BACKGROUND OF INVENTION

1. Field of the Invention

The invention relates to an optical anti-shake apparatus with a switchable light path, and more particularly to the apparatus that applies a switching device to drive an anti-shake device for performing switching operations so as to project one of two light paths onto an image capturing module via a lens module.

2. Description of the Prior Art

In an optical system consisted of an optical lens set and an image capturing module, such as a camera, a video recorder and so on, unexpected foreign forcing or hand shake of the camera and/or the video recorder may offset the light path so as to cause unstable imaging on the image capturing module. Namely, obscure images can hence be generated. One of many resorts in the art to resolve the aforesaid problem is to introduce a compensation mechanism for correcting the imaging. Such a compensation mechanism can be a digital compensation mechanism or an optical compensation mechanism. The digital compensation mechanism is to analyze and/or manage the digital image data captured by the image capturing module so as to obtain a clearer digital image. By the way, the digital compensation mechanism is also called as a digital anti-shake mechanism. On the other hand, the optical compensation mechanism usually introduces a shake-compensating device onto the optical lens set or the image capturing module. The optical compensation mechanism is also called as an optical anti-shake mechanism. The shake-compensating device is mainly to detect the deviation caused by the shaking upon the optical elements inside the optical lens set and further to have a driving member to tune the light path back to an optimal condition so as able to create a clearer image.

Currently in the marketplace, various 3C products, such as notebook computers, tablet computers, smart mobile phones and so on, are equipped with individual built-in cameras. Most of these built-in cameras are single-lens-ed. Seldom, some 3C products may have their own image modules with individual dual-lens units. Typically, the two lens of the dual-lens image module are located at different light paths. For example, in the smart mobile phone or the tablet computer having a dual-lens image module, the two light paths of the front lens and the rear lens are constructed along opposing 180-degree directions. Thereby, two sets of the image capturing modules are required to account for the follow-up image processing for the respective images captured from individual light paths. As a result, the 3C products can be made light and thin. Further, the 3C product may pay more for including the dual-lens image modules.

Accordingly, an improvement of the optical apparatus to have a switchable device going with a common image capturing module for processing the image data captured from both light paths and further to include an optical anti-shake device for compensating possible deviations resulted from unexpected/expected shaking during image capturing is definitely welcome to the skill in the art.

SUMMARY OF THE INVENTION

Accordingly, it is the primary object of the present invention to provide an optical anti-shake apparatus with a switchable light path that can utilize a switching device to drive an anti-shake device and so as further to project different light paths onto a common image capturing module via an optical lens module.

In the present invention, the optical anti-shake apparatus with a switchable light path is mounted in an optical system, in which the optical system includes at least two different light inlet windows for allowing lights to penetrate therethrough and reach at the optical system and thereby further for defining at least two respective light paths with different directions. The optical system further includes the optical anti-shake apparatus, at least two light inlet windows, a lens module and an image capturing module respective to the lens module. The optical anti-shake apparatus further includes an anti-shake device and a switching device.

The anti-shake device includes a light path adjusting element, a dual-axis rotary element and a drive module. The light path adjusting element, located correspondingly to the lens module, is mounted on the dual-axis rotary element so as to deflect lights introduced along one of the two light paths to project on the respective the image capturing module via the lens module. The dual-axis rotary element can perform a limited pivotal motion at least about a first axial direction and a second axial direction. The drive module, connected with the dual-axis rotary element, is to drive the dual-axis rotary element to perform the limited pivotal motion about the first axial direction and the second axial direction.

The switching device includes a fixing member, a rotary member and a driving member. The rotary member, pivotally connected with the fixing member, is to carry the anti-shake device and to rotate the rotary member via the driving member fixed at the fixing member and positioned in the space between the fixing member and the rotary member. Thereby, lights along the two different light paths can be switchable or optional to be projected onto the image capturing module through the optical lens module.

In one embodiment of the present invention, the driving member further includes at least a rolling ball, a friction element and a piezoelectric element. The rolling ball, located in the space between the fixing member and the rotary member, is to contact in-between the fixing member and the opposing friction element. The friction element, constructed on the rotary member, is located respectively to the piezoelectric element on the fixing member. The piezoelectric element drives the friction element to perform a linear motion, such that, while the anti-shake device on the rotary member rotates, lights along one of the two light paths can be chosen by the light path adjusting element.

In one embodiment of the present invention, the driving member further includes at least one magnet and a plurality of coils, in which the magnet is consisted of a plurality of N/S magnetic poles, and the plurality of coils is produced into a unique piece (for example, a fine pattern coil) by a particular manufacturing process. The magnet/magnets are mounted to the rotary member in a circular way. On the other hand, the coils are mounted at the fixing member also in a circular way, and each of the coils is located in correspondence to one magnet. The magnetism pair of every two neighboring magnets is presented in reverse polarity. By introducing currents to flow through the individual coils, rotational displacements would happen to the respective magnets in corresponding to the individual energized coils. The rotational displacements would further drive the rotary member to rotate about the fixing member in corresponding preset angles, centered at the center pillar. Then, the two different light paths can be switched and projected onto the same image capturing module.

All these objects are achieved by the optical anti-shake apparatus with a switchable light path described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an optical anti-shake apparatus with a switchable light path. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the present invention, the optical anti-shake apparatus with a switchable light path is mainly mounted in an optical system. The optical system further includes two different light inlet windows for allowing outside lights to be projected therethrough onto the optical system. The incident lights through the corresponding light inlet windows are characterized into defining respectively at least two different light paths with corresponding light inlet directions. The optical anti-shake apparatus applies a switching device to drive an anti-shake device to further lead lights along one of the two light paths to project on the image capturing module through the optical lens module.

Figure 1:
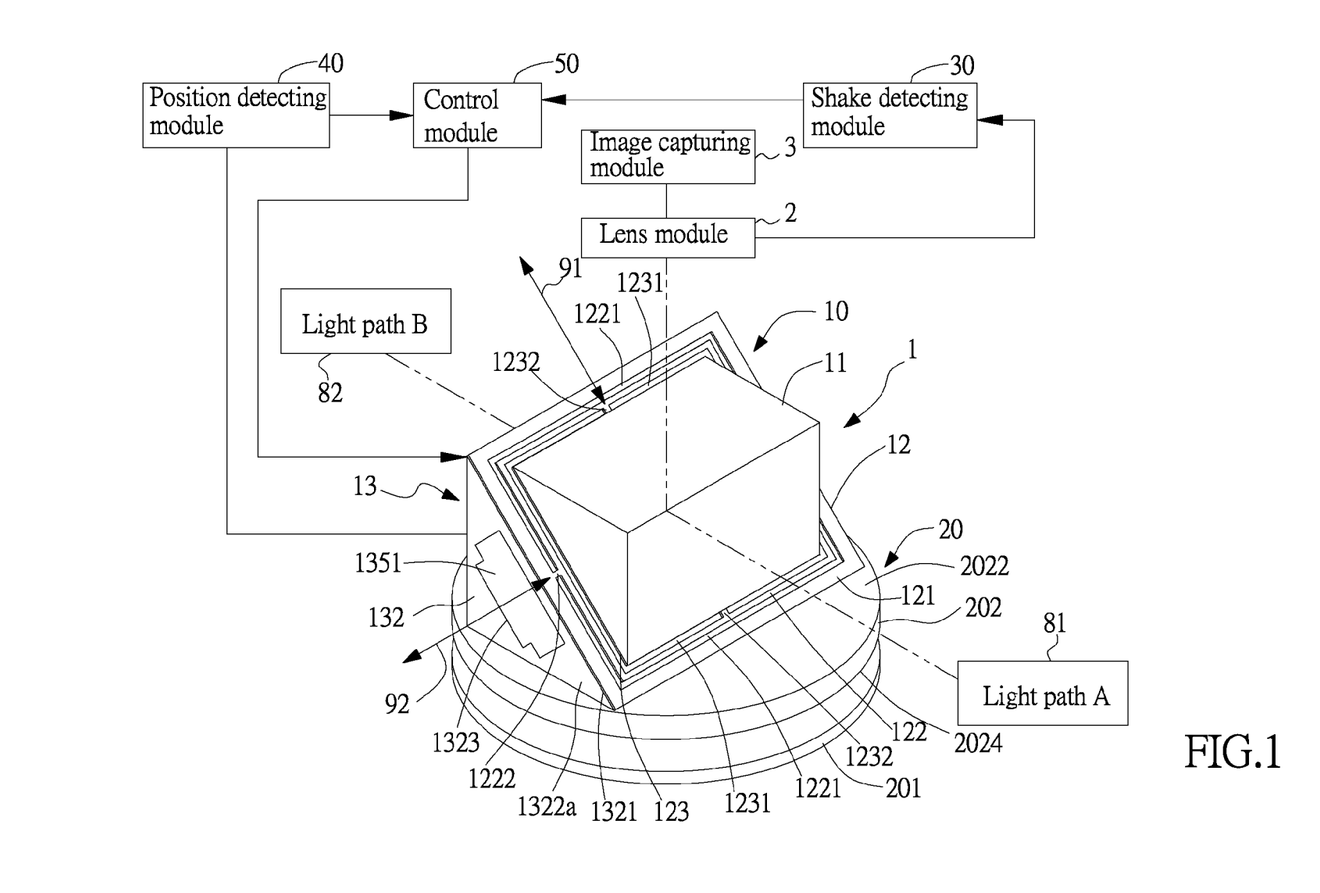
FIG. 1 shows schematically an optical system equipped with a first embodiment of the optical anti-shake apparatus with a switchable light path in accordance with the present invention.
Figure 2A:
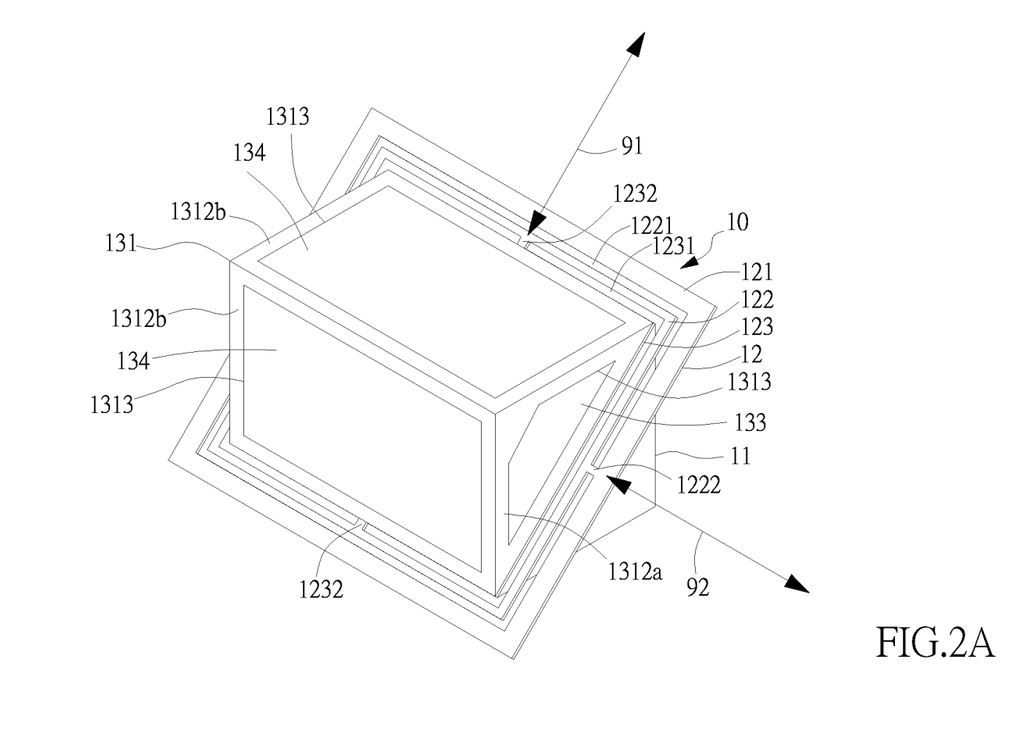
FIG. 2A is a perspective assembled bottom view of the bi-axial positioning element, the inner carrier frame and the magnet of FIG. 1.
Figure 2B:
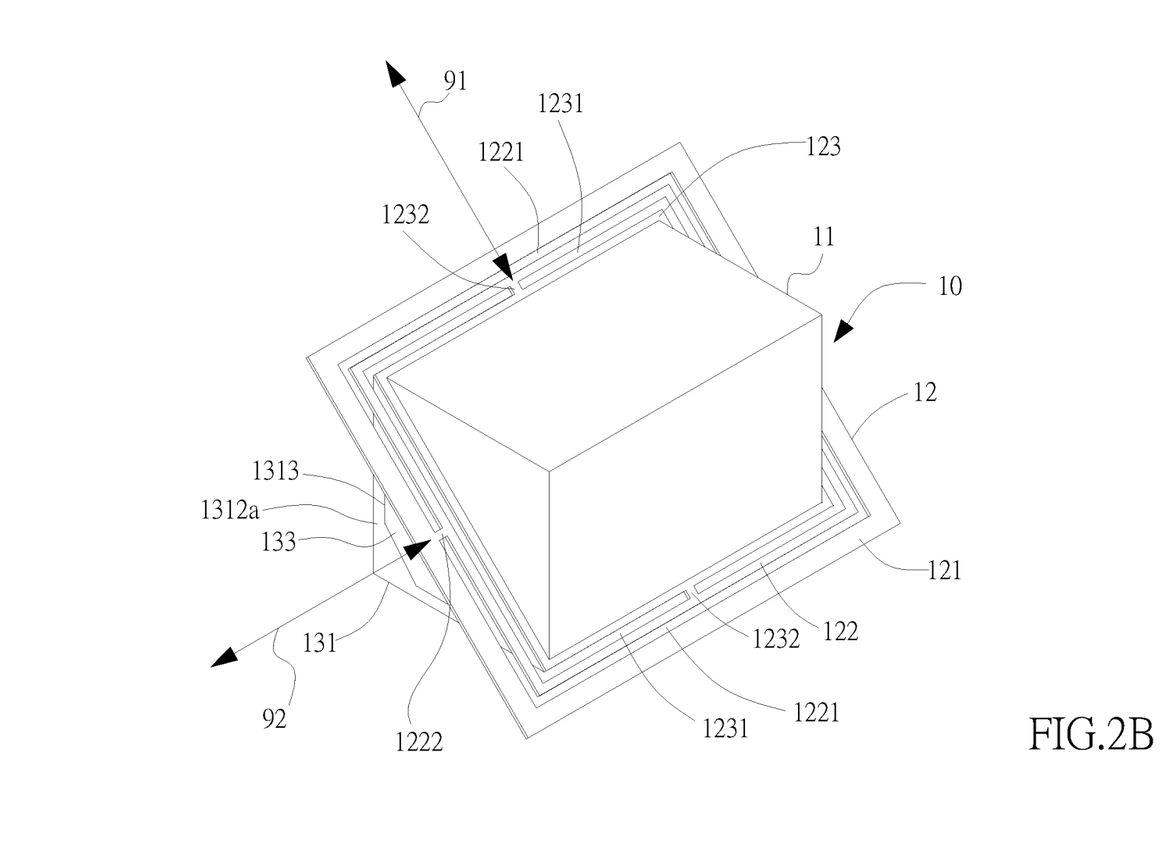
FIG. 2B is a perspective assembled top view of the bi-axial positioning element, the inner carrier frame and the magnet of FIG. 1.
Figure 3:
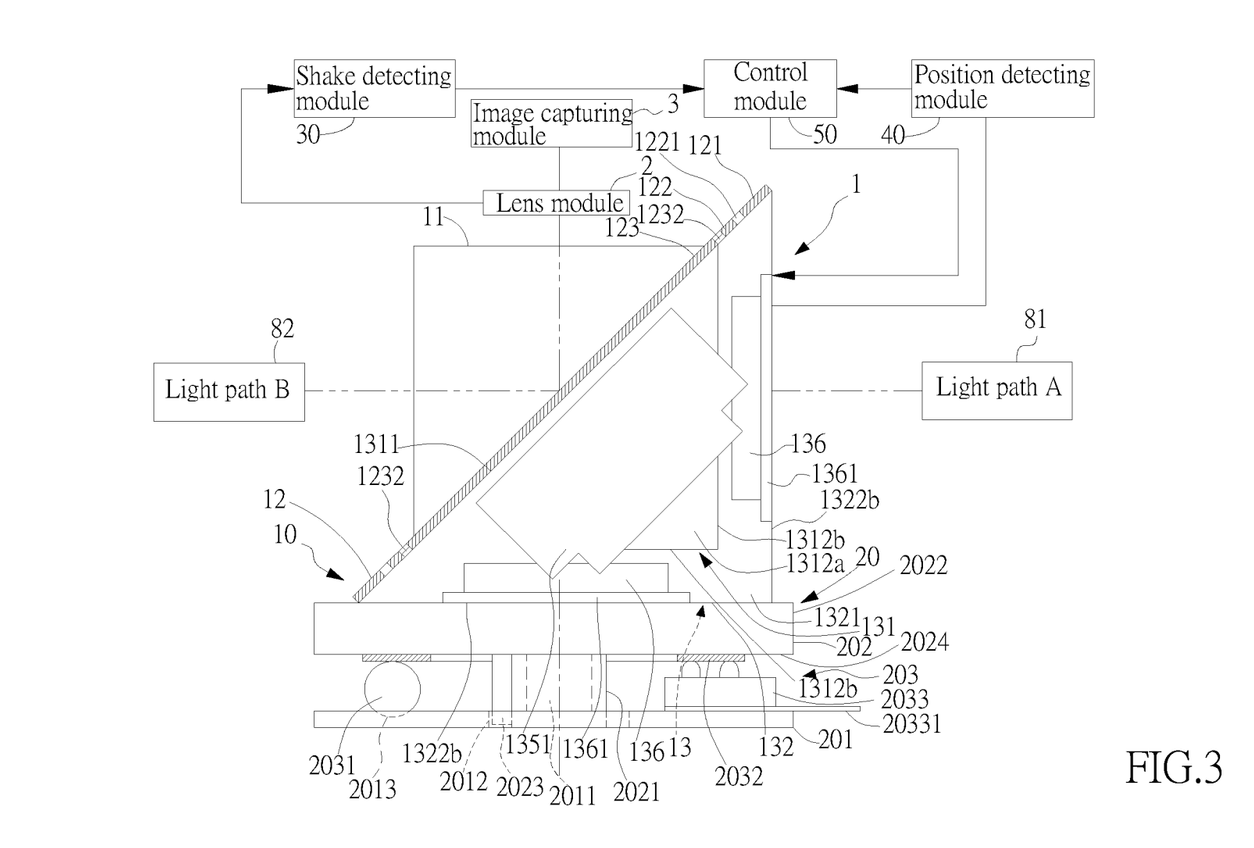
FIG. 3 is a schematic side view of FIG. 1.
Figure 4:
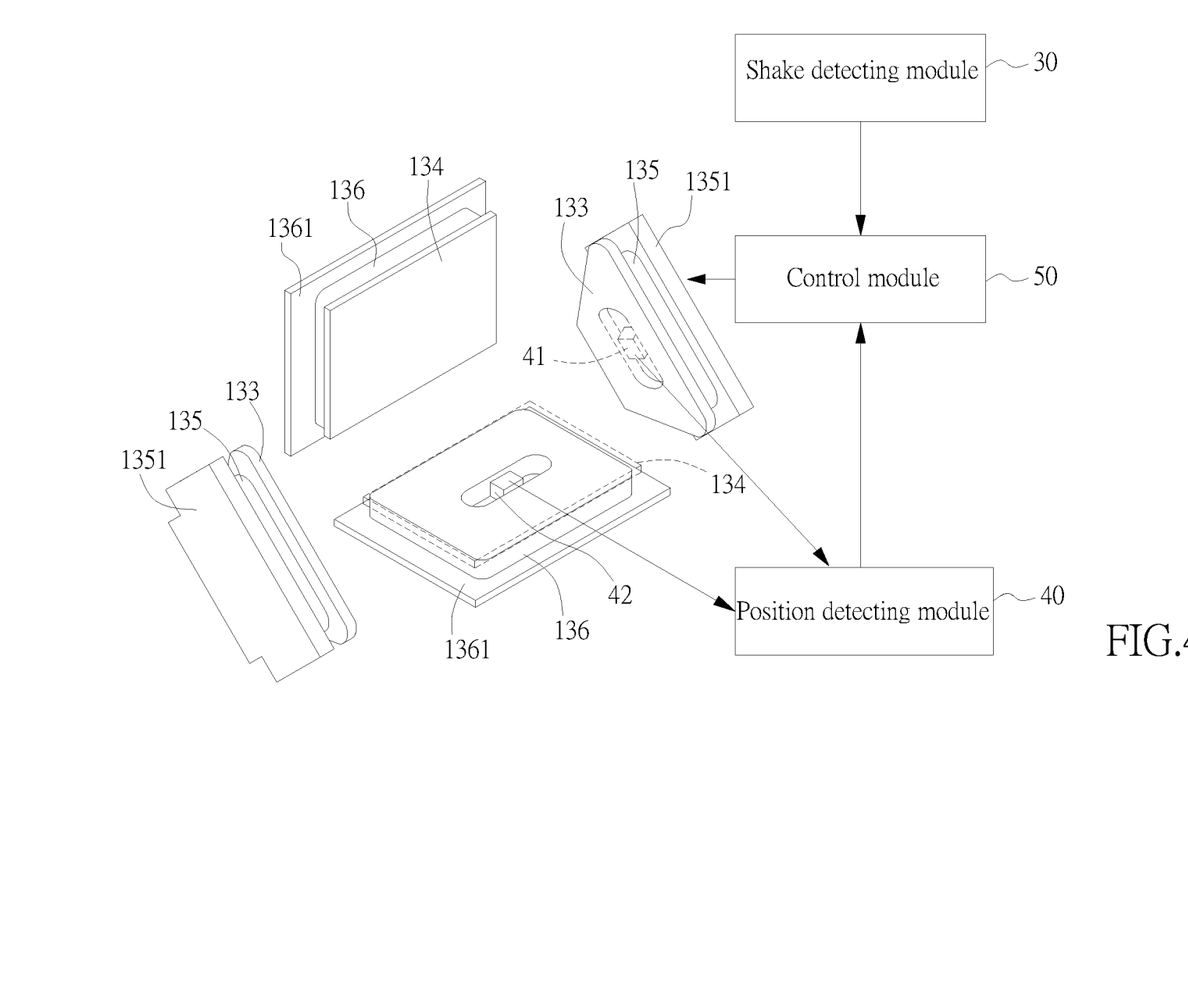
FIG. 4 shows in an exploded view of the magnet, the coil, the printed circuit board and the magnetic sensor of FIG. 1.

Referring now to FIG. 1 to FIG. 4, a first embodiment of the optical anti-shake apparatus with a switchable light path in accordance with the present invention is thoroughly illustrated. FIG. 1 shows the optical system loaded the first embodiment of the optical anti-shake apparatus with a switchable light path. FIG. 2A shows the assembly of the bi-axial positioning element, the inner carrier frame and the magnet of the first embodiment, in a perspective bottom view. FIG. 2B shows the same assembly of FIG. 2A, but in a perspective top view. FIG. 3 is a schematic side view of FIG. 1. FIG. 4 shows in an exploded view of the magnet, the coil, the printed circuit board and the magnetic sensor of FIG. 1.

As shown in FIG. 1, the optical anti-shake apparatus 1 with a switchable light path is mounted in an optical system, and the optical system includes the optical anti-shake apparatus 1, at least one lens module 2, an image capturing module 3 and at least two light inlet windows 81, 82 located to at least two different directions. By providing the at least two light inlet windows 81, 82 to allow lights to penetrate therethrough into the optical system, at least two light paths A, B are defined to include these lights through the at least two light inlet windows 81, 82. Each of the at least two light paths A, B is the light path that leads a foreign object at the specific direction to be imaged at the image capturing module 3 via the lens module 2. In the first embodiment of the present invention, the lens module 2 can include a plurality of focusing or zooming lenses, and the image capturing module 3 can include an image sensor selected from the group of CCD, CMOS, and any photo-detecting element the like. By having the lens module 2 to project and image the foreign object along one of the light paths A, B onto the photo-detecting element of the image capturing module 3, and then by having the image capturing module 3 to transform the captured image into the corresponding digital image data readable to the computer, it is obvious that the conventional task of the digital camera and/or the digital video recorder can be easily mimicked by the aforesaid combination of the lens module 2 and the image capturing module 3 of the present invention. For the lens module 2 and the image capturing module 3 are already matured art and not the featured technique of the present invention, details for these two modules would not be elucidated in the following description.

In the first embodiment of the present invention, the optical anti-shake apparatus 1 with a switchable light path is mounted among the two light paths A, B (with respect to the light inlet windows 81, 82 respectively) and the lens module 2. As shown in FIG. 1, the first embodiment 1 of the optical anti-shake apparatus with a switchable light path includes an anti-shake device 10, a switching device 20, a shake detecting module 30, a position detecting module 40 and a control module 50.

The anti-shake device 10 further includes a light path adjusting element 11, a dual-axis rotary element 12 and a drive module 13. The light path adjusting element 11 is located either at the light path A or at the light path B and at a position respective to the lens module 2. Also, the light path adjusting element 11 is mounted on the dual-axis rotary element 12 so as to guide the image lights travelled along one of the light paths A, B to reach the lens module 2 and then to be projected and imaged on the image capturing module 3. The dual-axis rotary element 12, located at one of the light paths A, B, can perform a limited pivotal motion at least along a first axial direction 91 and a second axial direction 92.

Referring now to FIG. 2, also in the first embodiment, the dual-axis rotary element 12 can be a rectangular thin spring plate having four lateral sides to define an outer frame portion 121, a middle frame portion 122 and an inner frame portion 123. The inner frame portion 123 has a plane facing one of the two light paths A, B (also, the two light inlet windows 81, 82), and the first axial direction 91 and the second axial direction 92 are also defined on the plane. The middle frame portion 122 is to encircle exteriorly around the inner frame portion 123. At least a first penetration groove 1231 is circled between the middle frame portion 122 and the inner frame portion 123, and also two first connection ends 1232 are also located between the middle frame portion 122 and the inner frame portion 123 and aligned in the first axial direction 91. In particular, the two first connection ends 1232 are located to opposing sides of the inner frame portion 123 and to substantially separate the first penetration groove 1231 to two U-shaped grooves. Namely, through these two first connection ends 1232, the inner frame portion 123 and the middle frame portion 122 are structurally connected. The outer frame portion 121 is to encircle exteriorly the middle frame portion 122, and at least a second penetration groove 1221 is constructed between the outer frame portion 121 and the middle frame portion 122. Two second connection ends 1222 are also located between the outer frame portion 121 and the middle frame portion 122 and aligned in the second axial direction 92. The two second connection ends 1222 are located to opposing sides of the middle frame portion 122 and to substantially separate the second penetration groove 1221 to two U-shaped grooves. Namely, through these two second connection ends 1222, the middle frame portion 122 and the outer frame portion 121 are structurally connected. It is noted that the two first connection ends 1232 and the two second connection ends 1222 are separated to four lateral sides of the rectangular thin spring plate. By providing the elastic thin spring plate, a limited pivotal motion of the inner frame portion 123 about the two first connection ends 1232 with respect to the outer frame portion 121 and along the first axial direction 91 can be performed. Similarly, another limited pivotal motion can be performed at the inner frame portion 123 about the two second connection ends 1222 with respect to the outer frame portion 121 and along the second axial direction 92. Upon such an arrangement, the design function of the dual-axis rotary element 12 can be achieved. Namely, by purposely grooving the thin spring plate to form a specific multi-groove frame structure, an integral simple-structured, small-size and cost-down dual-axis rotary element 12 can be obtained.

Referring to FIG. 1 through FIG. 4, the drive module 13 is coupled to the dual-axis rotary element 12 so as to drive the dual-axis rotary element 12 to perform respective limited pivotal motions along the first axial direction 91 and the second axial direction 92. In this embodiment, the drive module 13 is an electromagnetic drive module and includes at least an inner carrier frame 131, an outer carrier frame 132, at least a first magnet 133, at least a second magnet 134, at least a first coil 135 and at least a second coil 136.

The inner carrier frame 131 is connected in a co-motional manner to a bottom surface of the inner frame portion 123. The outer carrier frame 132 is motionlessly connected to a bottom surface of the outer frame portion 121. One of the first magnet 133 and the first coil 135 is mounted at the inner carrier frame 131, while another one thereof is mounted at the outer carrier frame 132. In this embodiment, the inner carrier frame 131 has two lateral sides neighboring to the two second connection ends 1222, and each of these two lateral sides is mounted by one first magnet 133. Also, the outer carrier frame 132 has two lateral sides neighboring to the two second connection ends 1222, and each of these two lateral sides is mounted by one first coil 135 at a position respective to the first magnet 133. By providing electricity to the two first coils 135, corresponding electromagnetic forcing can be induced to drive the two first magnets 133 and the inner frame portion 123 on the inner carrier frame 131 to perform the pivotal motion along the first axial direction 91.

One of the second magnet 134 and the second coil 136 is mounted at the inner carrier frame 131, while another one thereof is mounted at the outer carrier frame 132. In this embodiment, the inner carrier frame 131 has two lateral sides neighboring to the two first connection ends 1232, and each of these two lateral sides is mounted by one second magnet 134. Also, the outer carrier frame 132 has two lateral sides neighboring to the two first connection ends 1232, and each of these two lateral sides is mounted by one second coil 136 at a position respective to the second magnet 134. By providing electricity to the two second coils 136, corresponding electromagnetic forcing can be induced to drive the two second magnets 134 and the inner frame portion 123 on the inner carrier frame 131 to perform the pivotal motion along the second axial direction 92.

In this first embodiment, the inner carrier frame 131 is a wedge-shaped frame structure having a rectangular first contact portion 1311 connected to a bottom surface of the inner frame portion 123. Four lateral sides of the rectangular first contact portion 1311 are extended outward (away from the inner frame portion 123) to form four first lateral sides 1312a, 1312b. Two of these four first lateral sides 1312a are formed as two parallel right triangles, and the other two first lateral sides 1312b are rectangle and connected to form a right "Λ" shape. In addition, each of these four first lateral sides 1312a, 1312b has an individual first receiving set 1313.

The outer carrier frame 132 is also a wedge-shaped frame structure having a rectangular second contact portion 1321 connected to a bottom surface of the outer frame portion 121. Four lateral sides of the rectangular second contact portion 1321 are extended outward (away from the outer frame portion 121) to form four second lateral sides 1322a, 1322b. Two of these four second lateral sides 1322a are formed as two parallel right triangles, and the other two second lateral sides 1322b are rectangle and connected to form a right "Λ" shape. In addition, each of these four second lateral sides 1322a, 1322b has an individual second receiving set 1323.

In the first embodiment of the present invention, the first magnet 133 is mounted at the first receiving set 1313 of the triangular first lateral side 1312a of the inner carrier frame 131. The first coil 135 is mounted at the second receiving set 1323 of the triangular second lateral side 1322a of the outer carrier frame 132 via a first printed circuit board 1351. The second magnet 134 is mounted at the first receiving set 1313 of the rectangular first lateral side 1312b of the inner carrier frame 131. The second coil 136 is mounted at the second receiving set 1323 of the rectangular second lateral side 1322b of the outer carrier frame 132 via a second printed circuit board 1361. As described, in the present invention, by providing the wedge-shaped frame structure having right-angle lateral sides, the inner carrier frame 131 and the outer carrier frame 132 are used to mount and position the permanent magnets 133, 134 and the coils 135, 156, respectively. Upon such an arrangement of the electromagnetic driving pairs elucidated above, any optical system such as the digital camera or the digital video recorder can easily adopt this simple-structured, easy-assembled and inexpensive electromagnetic driving design provided by the present invention.

In the first embodiment of the present invention, the light path adjusting element 11, mounted on the plane of the inner frame portion 123 of the dual-axis rotary element 12, can deflect the lights travelling along the two light paths A, B to project on the lens module 2 and then further lead the lights through the lens module 2 to project on the image capturing module 3. As shown in FIG. 1, the light path adjusting element 11 is embodied as a wedge-shaped lens located on the plane of the inner frame portion 123. By having the wedge-shaped lens to deflect the image lights from one of the two light paths A, B (through the light inlet windows 81, 82 respectively) by a 90-degree angle, the incoming image lights can be projected onto the lens module 2 and further, after leaving the lens module 2, onto the image capturing module 3.

Figure 5:
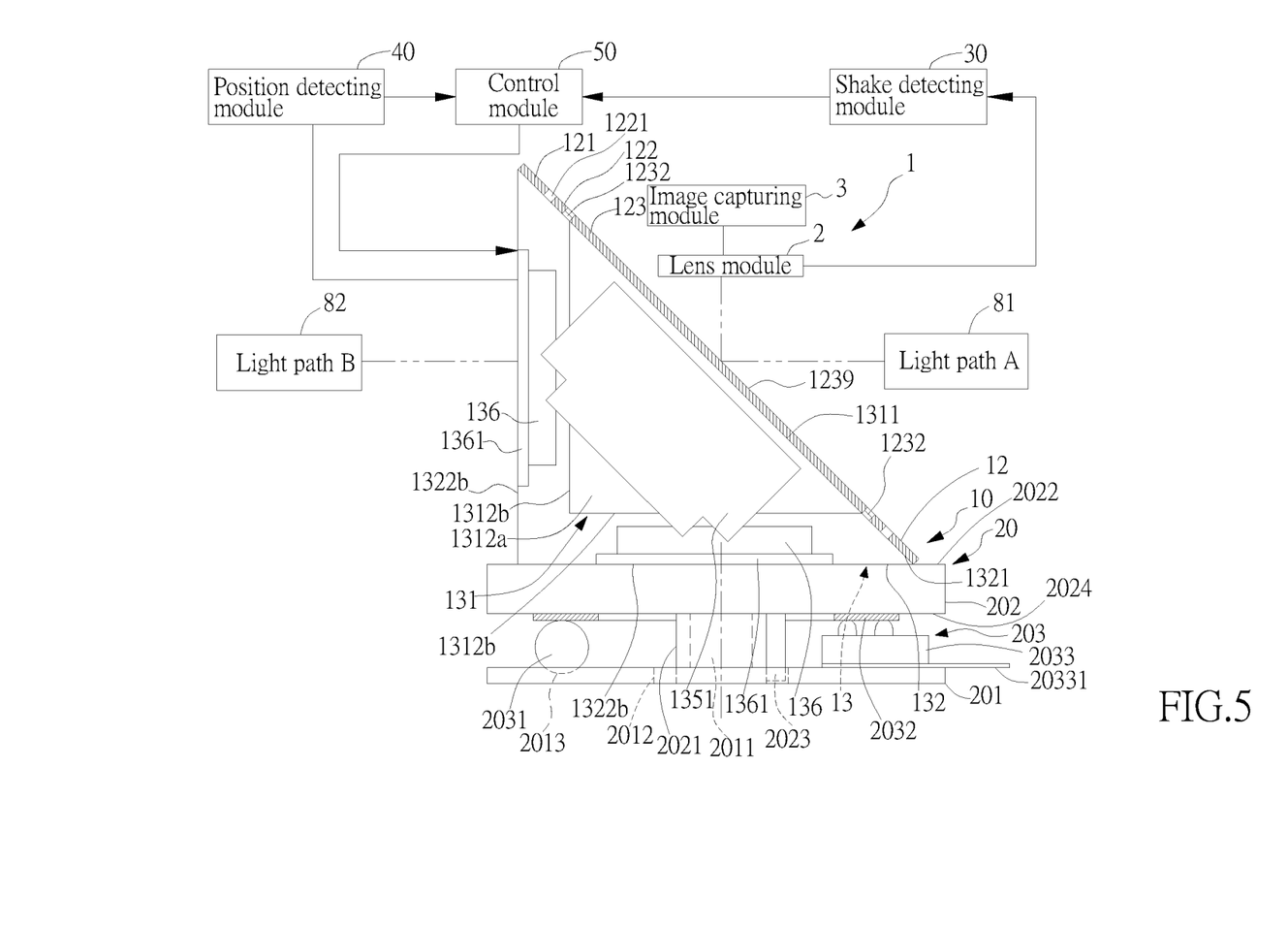
FIG. 5 is a schematic side view of an extension embodiment of FIG. 1.

Referring now to FIG. 5, an extension of the first embodiment of the optical anti-shake apparatus with a switchable light path in accordance with the present invention is schematically shown in an optical system. In this extension, the light path adjusting element 11 is embodied as an optical reflective layer 1239 painted directly on the plane of the inner frame portion 123. Similarly, by having the optical reflective layer 1239 to deflect the image lights from one of the two light paths A, B (through the light inlet windows 81, 82 respectively) by a 90-degree angle, the incoming image lights can be projected onto the lens module 2 and further, after leaving the lens module 2, onto the image capturing module 3. Upon such an arrangement, the switch operation between the two light paths A, B can still be performed.

Figure 6:
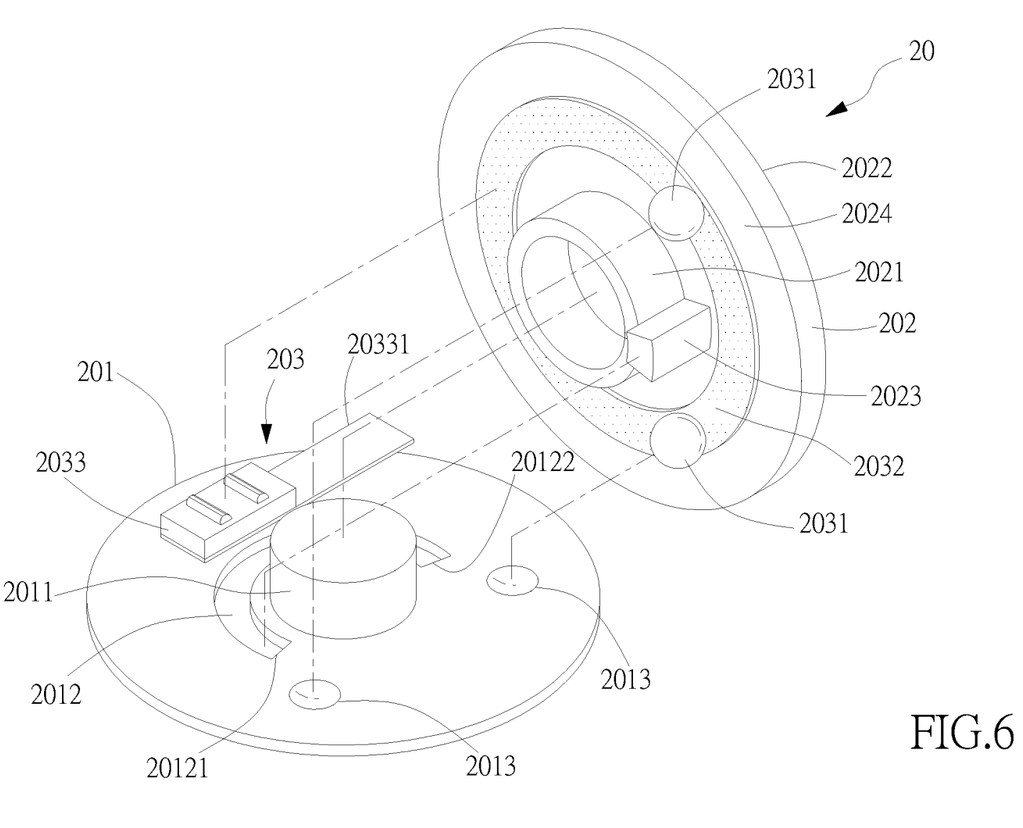
FIG. 6 is an exploded view of the switching device of FIG. 1.

Refer now to FIG. 6 and also FIG. 3, in which FIG. 6 is an exploded view of the switching device of the first embodiment of the optical anti-shake apparatus with a switchable light path in accordance with the present invention. As shown, the switching device 20 includes a fixing member 201, a rotary member 202 and a driving member 203. The fixing member 201 can be made of a yoke iron with a specific function of magnetic attraction. The rotary member 202 can be a magnet or a carrier loaded with the magnet. The rotary member 202 can introduce a pivotal sleeve 2021 to be pivotally connected with a center pillar 2011 of the fixing member 201, and a first surface 2022 of the rotary member 202 is to support the anti-shake device 10. By having the driving member 203 fixed to the fixing member 201 at a position in the central space between the fixing member 201 and the rotary member 202 to rotate the rotary member 202, then image lights along any selected one of the two light paths A, B can be use the same lens module 2 to be further projected onto the image capturing module 3.

A circular guide slot 2012 is constructed at the fixing member 201, while a corresponding position block 2023 is protruded from a lateral side of the pivotal sleeve 2021 on the rotary member 202. By having the position block 2023 to be plugged into and thus able to slide along the guide slot 2012, the rotary member 202 can then perform a preset limited rotation with respect to the fixing member 201 about the center pillar 2011. While in the preset limited rotation, the position block 2023 is actually slippery in the guide slot 2012 between two guide ends 20121, 20122. While the position block 2023 reaches the guide end 20121 or the guide end 20122, the light path A or B is respectively aligned. Therefore, by assigning purposely the two guide ends 20121, 20122 to the guide slot 2012, the rotational limit of the rotary member 202 with respect to the fixing member 201 can be determined. In particular, the two guide ends 20121, 20122 are to define the selection of the two light paths A, B and the angle in between. Upon such an arrangement, the light path adjusting element 11 can be rotated to match the light path A or B via the switching device 20.

In the first embodiment of the present invention, in the case that the position block 2023 is at the guide end 20121 of the guide slot 2012, the image lights along the light path A can be 90-degreely deflected by the light path adjusting element 11 to the image capturing module 3. On the other hand, while the position block 2023 utilizes the driving member 203 to rotate along the guide slot 2012 from the guide end 20121 to the another guide end 20122, the rotary member 202 travels 180 degrees with respect to the fixing member 201. At this time, the light path adjusting element 11 can deflect the image lights coming along the light path B 90-degreely to the same image capturing module 3. On the other hand, while the position block 2023 utilizes the driving member 203 to rotate along the guide slot 2012 from the guide end 20122 to the another guide end 20121, the rotary member 202 travels 180 degrees back with respect to the fixing member 201. At this time, the selected light path is switched to the light path A from the light path B. Thereby, the image capturing module 3 can perform the switchable task between the two light paths A, B.

In the first embodiment of the present invention, the driving member 203 of the switching device 20 further includes at least a rolling ball 2031, a friction element 2032 and a piezoelectric element 2033. The rolling ball 2031 is sit in a corresponding swallow position cavity 2013 on the fixing member 201 and topped at a predetermined position at the rotary member 202 by contacting the friction element 2032 of the rotary member 202, such that the rotary member 202 can stably rotate on and with respect to the fixing member 201. For both the fixing member 201 and the rotary member 202 are characterized by magnetic attraction, thus the piezoelectric element 2033 can adhere to the fixing member 201, and the rolling ball 2031 is also attracted in the swallow position cavity 2013 by the magnetic attraction. In the first embodiment of the present invention, the at least a rolling ball 2031 can be two or more balls located individually in the respective swallow position cavities 2013. Namely, the two swallow position cavities 2013 in the fixing member 201 as shown in FIG. 6 are to receive and position the two rolling balls 2031. When the rotary member 202 is pivotally connected with the fixing member 201, another side of the rolling ball 2031 in the swallow position cavity 2013 would contact at the friction element 2032. In the present invention, the number of the swallow position cavities 2013 is identical to that of the rolling balls 2031. In the first embodiment, two pairs of the rolling ball 2031 and the swallow position cavity 2013 are shown. In FIG. 6, the aforesaid two pairs and the piezoelectric element 2033 are 120-degree spaced around the center pillar 2011 on the fixing member 201.

In the present invention, the friction element 2032 is an annular strip on a second surface 2024 of the rotary member 202 to contact with the piezoelectric element 2033 and the rolling balls 2031 of the fixing member 201. Through the piezoelectric element 2033 on a printed circuit board 20331 to drive the friction element 2032 to undergo a linear motion, the anti-shake device 10 on the first surface 2022 of the rotary member 202 can then be rotated so as to further activate the light path adjusting element 11 to perform switching between the light paths A and B. In the first embodiment of the present invention, the friction element 2032 can be made of a ceramic material.

Namely, the anti-shake device 10 is fixed on the first surface 2022 of the rotary member 202 of the switching device 20 via one of the rectangular second lateral sides 1322b, such that the light path adjusting element 11 on the anti-shake device 10 can move with the rotary member 202 through the driving member 203 on the fixing member 201. That is, the light path adjusting element 11 in the state of the light path A uses the piezoelectric element 2033 on the fixing member 201 to push the friction element 2032 on the rotary member 202 to undergo a linear motion. Then, the light path adjusting element 11 on the rotary member 202 can rotate 180 degrees to match the light path B (in this embodiment, the two light paths A, B are separated by 180 degrees), such that the image lights along the light path B can be 90-degreely deflected to the optical lens module 2 and further to the image capturing module 3. On the other hand, the piezoelectric element 2033 can be applied to rotate the light path adjusting element 11 of the rotary member 202 180-degree back to the original state matching the light path A, and then the image lights along the light path A can be 90-degreely deflected to the optical lens module 2 and further to the image capturing module 3.

In the first embodiment of the present invention, the shake detecting module 30 is mounted on the lens module 2 to detect the shaking of the lens module 2, in which the shaking would induce corresponding deviations at the light paths A, B. For the shake detecting module 30 can be adopted from the product already in the marketplace, details there-about would be omitted herein.

In the first embodiment of the present invention, the position detecting module 40 is mounted on the drive module 13 to detect the pivotal displacement of the dual-axis rotary element 12 along the first axial direction 91 and the second axial direction 92. As shown in FIG. 4, the position detecting module 40 includes a first magnetic sensor 41 mounted in the center of the corresponding first coil 135 respective to the corresponding first magnet 133, and a second magnetic sensor 42 mounted in the center of the corresponding second coil 136 respective to the corresponding second magnet 134. By providing the first and the second magnetic sensors 41, 42 to detect variations of the magnetic fields or lines, the control module 50 can then calculate the corresponding pivotal displacement of the dual-axis rotary element 12.

In the first embodiment of the present invention, the control module 50 is coupled with the shake detecting module 30, the position detecting module 40 and the drive module 13 to detect the shaking of the lens module 2 according to the shake detecting module 30, to detect the pivotal displacement of the dual-axis rotary element 12 according to the position detecting module 40, and further to control the drive module 13 to pivotally rotate the dual-axis rotary element 12, such that the deviations of the light path caused by the shaking on the lens module 2 can be compensated. For the control module 50 can be adopted from the product already in the marketplace, details there-about would be omitted herein.

As stated above, the first embodiment 1 of the optical anti-shake apparatus with a switchable light path in accordance with the present invention can switch the light paths A, B for choosing the corresponding image lights to be projected onto the lens module 2. Through the switching device 20 to 180-degreely rotate the anti-shake device 10 carried by the rotary member 202 pivotally connected with the fixing member 201, the light path adjusting element 11(wedge-shaped lens) fixed at the anti-shake device 10 can then rotate to aim at one of the two light paths A, B, and further deflect the image lights along the aimed light path A or B to the lens module 2. The lens module 2 further projects the image lights onto the image capturing module 3. Upon such an arrangement, the two different light paths A, B can adopt the switching device 20 to apply the same lens module 2 and the same image capturing module 3 for benefiting the anti-shake function.

Figure 9:
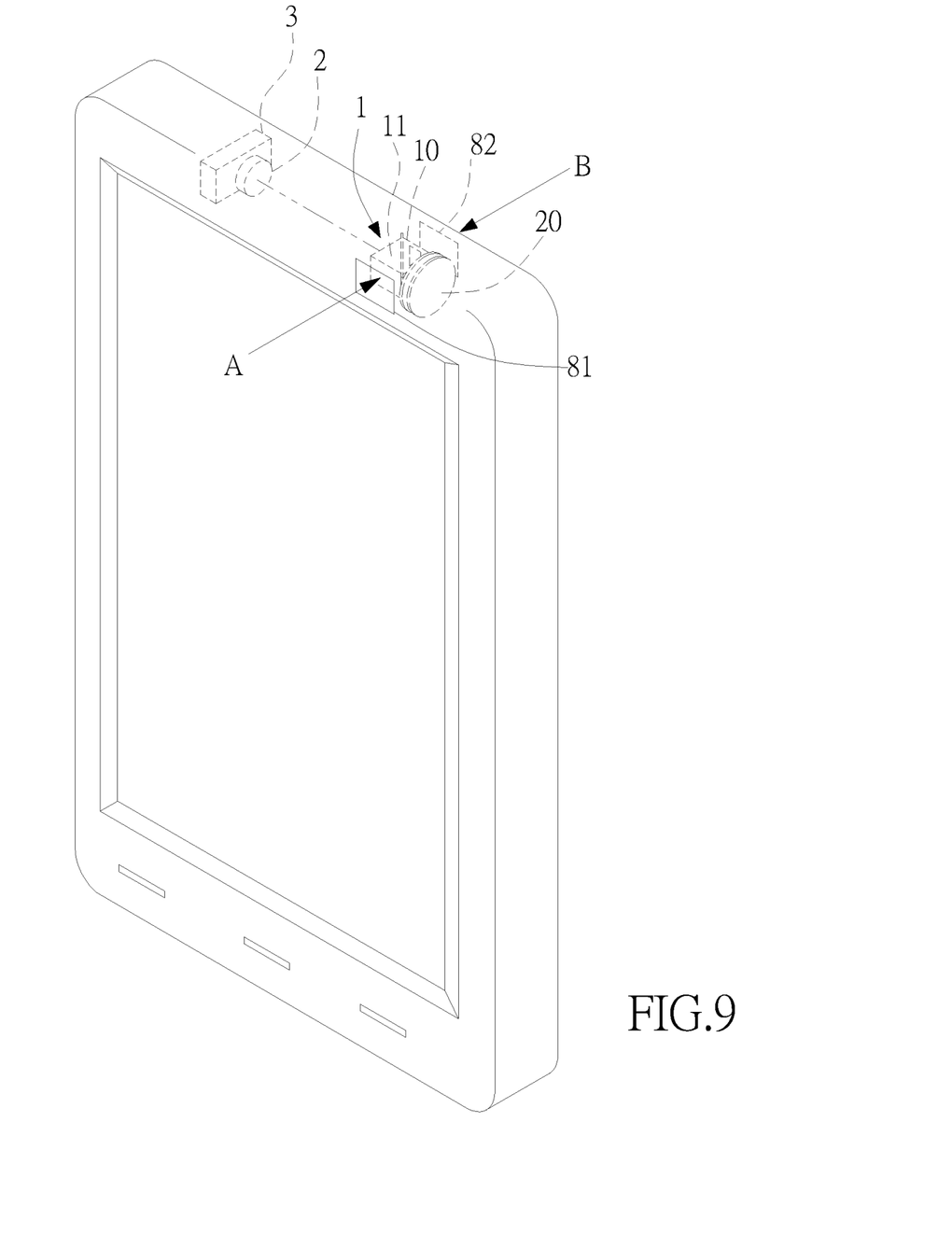
FIG. 9 shows schematically an application of the first embodiment of the optical anti-shake apparatus with a switchable light path in accordance with the present invention.

Referring now to FIG. 9, an application of the first embodiment of the optical anti-shake apparatus with a switchable light path in accordance with the present invention is schematically shown. The optical system for carrying the first embodiment can be a photographing module of a smart mobile phone (thereafter for the optical system). The light paths A, B (i.e., the light inlet windows 81, 82) are furnished to the front surface and the back surface of the smart mobile phone, respectively, so as to capture image of the foreign object at different positions and to project the image lights onto the image capturing module 3 via the optical lens module 2 inside the smart mobile phone. Namely, the optical anti-shake apparatus with a switchable light path 1 of the present invention is built inside the smart mobile phone at a place between the two light paths A, B and the lens module 2. Through the switching device 20, the light path adjusting element 11 fixed at the anti-shake device 10 can perform the aforesaid 180-degree rotational switch between the two light paths A, B so as to project the image lights along either of the two light paths A, B to project onto the lens module 2 and further onto the image capturing module 3.

In the following description of other embodiments of the present invention, the same names and labels will be assigned to those elements in the following embodiments who are largely the same as the respective elements in the foregoing embodiment, and details for those elements will be omitted. For those elements in the following embodiments who are similar to the respective elements in the foregoing embodiment, the same names will be assigned but the corresponding numbers will be suffixed by a letter, and again details for those elements will be omitted.

Figure 7:
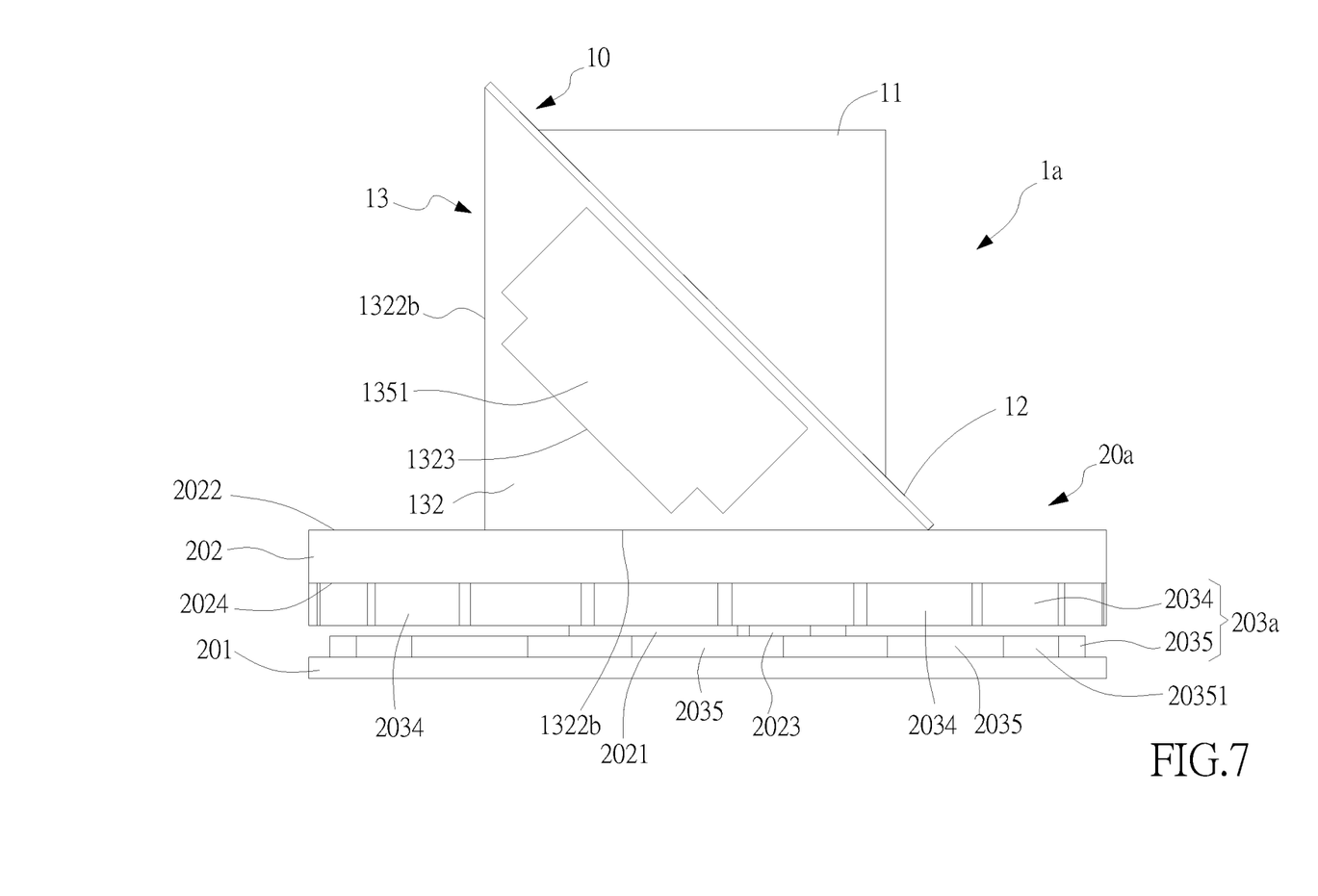
FIG. 7 is a side view of a second embodiment of the optical anti-shake apparatus with a switchable light path in accordance with the present invention.
Figure 8:
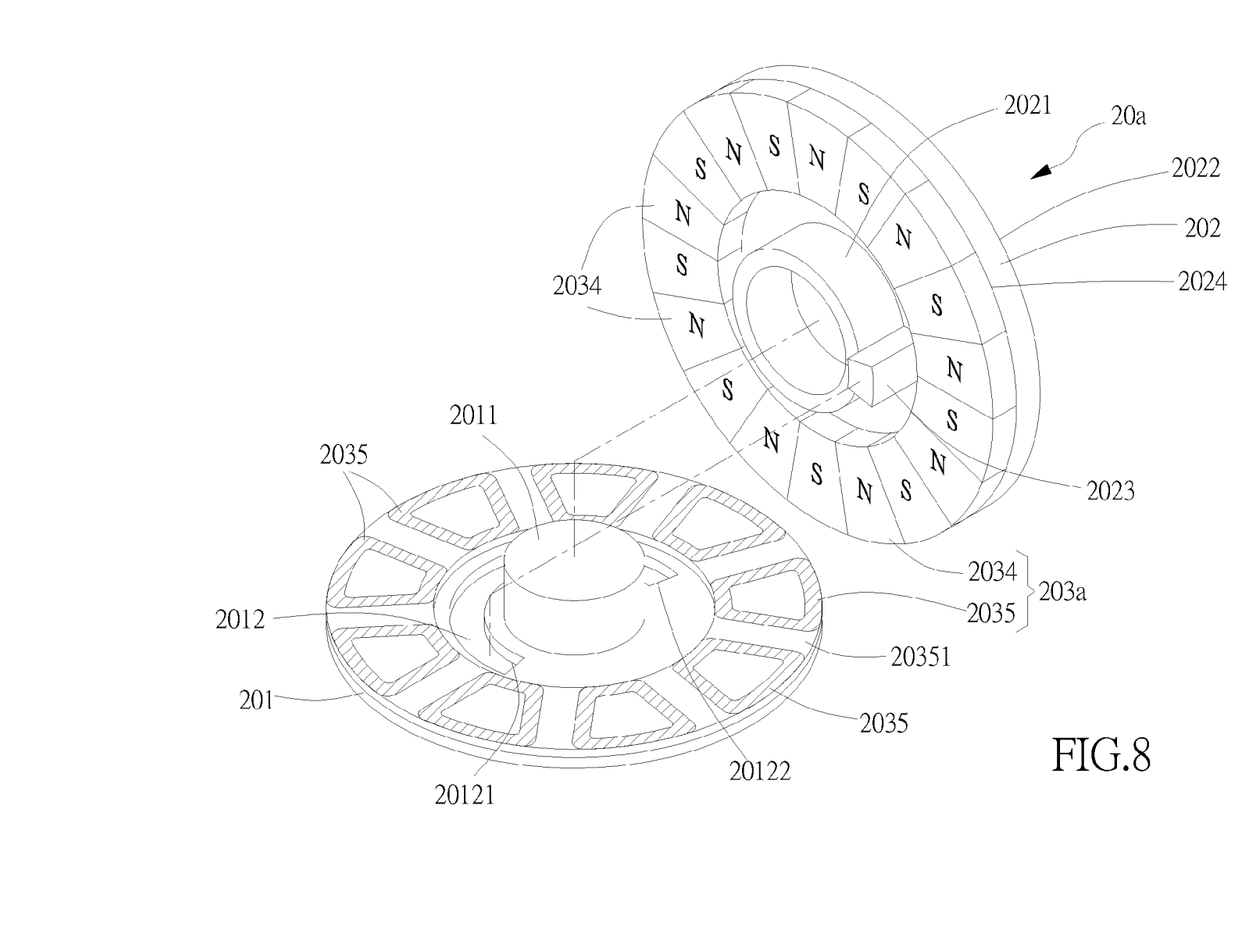
FIG. 8 is an exploded view of the switching device of FIG. 7.

Referring now to FIG. 7 and FIG. 8, FIG. 7 is a side view of a second embodiment of the optical anti-shake apparatus with a switchable light path in accordance with the present invention, and FIG. 8 is an exploded view of the switching device of FIG. 7. As shown, the major difference between this second embodiment 1a and the foregoing first embodiment 1 is that the driving member 203a of the switching device 20a in the second embodiment 1a further includes at least a magnet 2034 and a plurality of corresponding coils 2035. The at least one magnet 2034 (plural magnets 2034 shown in the figures) is consisted of a plurality of N/S magnetic poles, and the plurality of coils 2035 is formed as a unique piece (for example, formed as a fine pattern coil). The magnets 2034 in an annular shape are mounted to the second surface 2024 of the rotary member 202. On the other hand, the corresponding coils 2035 formed in a pairing annular form are mounted onto the fixing member 201 at a position spaced to the corresponding magnets 2034 by a predetermined spacing. For the fixing member 201 and the rotary member 202 can provide substantial magnetic attractions, the magnets 2034 and the coils 2035 can better and firmly attach to the rotary member 202 and the fixing member 201, respectively. In the second embodiment, the coils 2035 can be annularly installed on a base plate 20351 and electrically connected. The base plate 20351 centered around the center pillar 2011 is located on the fixing member 201, and is to have the coils 2035 to space from the respective magnets 2034 on the rotary member 202 by a predetermined spacing.

As shown, the driving member 203a is located in an empty space between the fixing member 201 and the rotary member 202. The magnet 2034 and the coils 2035 are mounted to the rotary member 202 and the fixing member 201, respectively. By having the pivotal sleeve 2021 as a center, the magnets 2034 are annularly mounted on the second surface 2024 of the rotary member 202 by a manner of alternative arranging the N pole and the S pole. In the second embodiment, nine magnets 2034 having individual N/S magnetic poles are included (noted that the determination of the number of the magnets 2034 is dependent on the original design and the number of the corresponding coils 2035). Also, the magnets 2034 are even annularly distributed on the second surface 2024. In addition, in the second embodiment, nine coils 2035 are mounted onto the fixing member 201 in correspondence to the aforesaid nine magnets 2034. These coils 2035 are even annularly distributed on the base plate 20351 and around the center pillar 2011 of the fixing member 201. The base plate 20351 is fixed on the fixing member 201, and each of coils 2035 are largely located respective to one of the magnets 2034 with N/S magnetic poles.

Accordingly, as the same current is introduced to orderly energize the coils 2035 on the base plate 20351 so as to have the coils 2035 to induce the same magnetic fields, then magnetic attraction or repulsion would be formed in each pair of the coil 2035 and the magnet 2034. For the rotary member 202 is pivotally connected to the center pillar 2011 of the fixing member 201 via the pivotal sleeve 2021, the aforesaid magnetic attraction or repulsion would drive the magnets 2034 to perform rotational displacement, and further to drive the rotary member 202 to rotate in a predetermined angle about the center pillar 2011 with respect to the fixing member 201. By applying the electromagnetic forcing similar to that provide by a typical electromagnetic motor, the light path adjusting element 11 on the rotary member 202 can then be displaced, and thus the object of switching between the two light paths A, B so as able to deflect the image lights from different directions onto the same image capturing module 3 can be achieved.

While the present invention has been particularly shown and described with reference to a preferred embodiment, it will be understood by those skilled in the art that various changes in form and detail may be without departing from the spirit and scope of the present invention.

What is claimed is:

1. An optical anti-shake apparatus with a switchable light path, mounted in an optical system further having a lens module, an image capturing module located corresponding to the lens module and at least two light inlet windows, at least two different light paths being defined respectively upon lights injected onto the optical system through the at least two light inlet windows, comprising:
    an anti-shake device, further including a light path adjusting element located respective to the lens module; and
    a switching device, carrying the anti-shake device and driving the anti-shake device as well as the light path adjusting element to perform a switching operation so as to have lights along one of the at least two different light paths to be projected onto the image capturing module via the lens module;
    wherein the anti-shake device further includes a dual-axis rotary element and a drive module, the light path adjusting element is mounted on the dual-axis rotary element so as able to deflect the lights to project onto the lens module, the dual-axis rotary element performs at least a limited pivotal motion about a first axial direction and a second axial direction, the drive module connected to the dual-axis rotary element is to drive the dual-axis rotary element to perform the limited pivotal motion, the switching device includes a fixing member, a rotary member and a driving member, the driving member fixed at the fixing member is located between the fixing member and the rotary member, and the rotary member pivotally connected to the fixing member is to mount the anti-shake device and to drive the rotary member via the driving member;
    wherein the fixing member further includes a circular guide slot having two guide ends and a position block protruded from the rotary member, the position block being plugged into the guide slot for sliding therealong so as to have the rotary member able to perform a preset limited rotation with respect to the fixing member, the two light paths A and B being correctly aligned while the position block reaches the respective guide ends.

2. The optical anti-shake apparatus with a switchable light path according to claim 1, wherein the dual-axis rotary element is a thin spring plate, the thin spring plate further includes an outer frame portion, a middle frame portion and an inner frame portion, the inner frame portion engages the light path adjusting element, the first axial direction and the second axial direction are defined on the inner frame portion, the middle frame portion is to encircle exteriorly the inner frame portion, at least one first penetration groove and two first connection ends along the first axial direction are located between the middle frame portion and the inner frame portion, the inner frame portion connects with the middle frame portion through the two first connection ends, the outer frame portion encircles exteriorly the middle frame portion, at least one second penetration groove and two second connection ends along the second axial direction are located between the outer frame portion and the middle frame portion, and the middle frame portion connects the outer frame portion through the two second connection ends.

3. The optical anti-shake apparatus with a switchable light path according to claim 1, wherein:
    the drive module is an electromagnetic drive module including at least an inner carrier frame, an outer carrier frame, at least one first magnet, at least one second magnet, at least one first coil and at least two one second coil;
    the inner carrier frame connects and co-moves with the inner frame portion;
    the outer carrier frame is motionless and connects with the outer frame portion;
    one of the at least one first magnet the at least one first coil is located at the inner carrier frame while another one of the at least one first magnet the at least one first coil is located at the outer carrier frame, an electromagnetic force is generated by energizing the at least one first coil to drive the inner carrier frame and the inner frame portion to perform the pivotal motion along the first axial direction; and
    one of the at least one second magnet the at least one second coil is located at the inner carrier frame while another one of the at least one second magnet the at least one second coil is located at the outer carrier frame, another electromagnetic force is generated by energizing the at least one second coil to drive the inner carrier frame and the inner frame portion to perform the pivotal motion along the second axial direction.

4. The optical anti-shake apparatus with a switchable light path according to claim 3, wherein:
    the inner carrier frame is a wedge-shaped frame structure having a rectangular first contact portion connected to a bottom surface of the inner frame portion, four lateral sides of the rectangular first contact portion being extended outward away from the inner frame portion to form four first lateral sides, two of these four first lateral sides being formed as two parallel right triangles while another two first lateral sides are rectangle and connected to form a right "Λ" shape, each of these four first lateral sides having an individual first receiving set;
    the outer carrier frame is a wedge-shaped frame structure having a rectangular second contact portion connected to a bottom surface of the outer frame portion, four lateral sides of the rectangular second contact portion being extended outward away from the outer frame portion to form four second lateral sides, two of these four second lateral sides being formed as two parallel right triangles while another two second lateral sides are rectangle and connected to form a right "Λ" shape, each of these four second lateral sides having an individual second receiving set;
    the first magnet is mounted at the first receiving set of the triangular first lateral side of the inner carrier frame, and the first coil is mounted at the second receiving set of the triangular second lateral side of the outer carrier frame via a first printed circuit board; and the second magnet is mounted at the first receiving set of the rectangular first lateral side of the inner carrier frame, and the second coil is mounted at the second receiving set of the rectangular second lateral side of the outer carrier frame via a second printed circuit board.

5. The optical anti-shake apparatus with a switchable light path according to claim 3, wherein the anti-shake device further includes:
   a shake detecting module, mounted on the lens module to detect shaking of the lens module;
   a position detecting module, mounted on the drive module to detect pivotal displacements of the dual-axis rotary element in the first axial direction and the second axial direction; and
   a control module, connected with the shake detecting module, the position detecting module and the drive module to control the drive module to pivotally rotate the dual-axis rotary element so that deviations of the light path caused by the shaking on the lens module can be compensated, according to the shaking of the lens module detected by the shake detecting module and the pivotal displacements of the dual-axis rotary element detected by the position detecting module.

6. The optical anti-shake apparatus with a switchable light path according to claim 5, wherein the position detecting module includes a first magnetic sensor mounted in a center of the corresponding first coil respective to the corresponding first magnet, and a second magnetic sensor mounted in a center of the corresponding second coil respective to the corresponding second magnet, the first magnetic sensor and the second magnetic sensor being applied to detect variations of the magnetic fields for the control module to calculate the corresponding pivotal displacement of the dual-axis rotary element, wherein the light path adjusting element is one of a wedge-shaped lens mounted on the surface of the inner frame portion and an optical reflective layer mounted on the surface of the inner frame portion.

7. The optical anti-shake apparatus with a switchable light path according to claim 1, wherein the fixing member is a yoke iron with magnetic attraction, and wherein the rotary member is one of a magnet and a carrier having a magnet.

8. The optical anti-shake apparatus with a switchable light path according to claim 1, wherein the driving member further includes at least one rolling ball, a friction element and a piezoelectric element, the at least one rolling ball located between the fixing member and the rotary member contacts with both the fixing member and the friction element, the friction element is mounted on the rotary member at a position respective to the piezoelectric element on the fixing member, and the piezoelectric element drives the friction element to perform a linear motion so as to rotate the anti-shake device on the rotary member and further to switch between the two different light paths via the light path adjusting element.

9. The optical anti-shake apparatus with a switchable light path according to claim 1, wherein the driving member further includes at least one magnet and a plurality of coils, the at least one magnet mounted at the rotary member has a plurality of N/S magnetic poles, and the plurality of coils formed as a unique piece is mounted on the fixing member in positions respective to the at least one magnet.

* * * * *